United States Patent [19]

Johansson et al.

[11] Patent Number: 4,963,330
[45] Date of Patent: Oct. 16, 1990

[54] METHOD AND APPARATUS FOR TREATING CONTAMINATED GASES

[75] Inventors: Lars-Erik Johansson; Per-Gunnar Jacobsson, both of Växjö, Sweden

[73] Assignee: Fläkt AB, Sweden

[21] Appl. No.: 358,152

[22] Filed: May 30, 1989

Related U.S. Application Data

[63] Continuation-in-part of Ser. No. 129,874, Dec. 4, 1987, abandoned, which is a continuation of Ser. No. 852,635, Apr. 16, 1986, abandoned.

[30] Foreign Application Priority Data

Apr. 16, 1985 [SE] Sweden .............................. 8501851

[51] Int. Cl.$^5$ .......................... B01D 53/34; B05B 1/28
[52] U.S. Cl. ...................................... 422/168; 239/105; 239/290; 239/296; 261/116; 422/159; 422/224; 422/310
[58] Field of Search ............... 261/116; 239/105, 290, 239/299, 300, 296; 422/159, 168, 224, 310

[56] References Cited

U.S. PATENT DOCUMENTS

| | | | |
|---|---|---|---|
| 1,752,031 | 3/1930 | Schaer | 239/105 |
| 2,613,737 | 10/1952 | Schwietert | 239/431 |
| 3,885,918 | 5/1975 | Isahaya | 422/224 |
| 4,083,932 | 4/1978 | Muraco et al. | 239/290 |

FOREIGN PATENT DOCUMENTS 79081 5/1983 European Pat. Off. .

Primary Examiner—Joye L. Woodard
Attorney, Agent, or Firm—Burns, Doane, Swecker & Mathis

[57] ABSTRACT

According to the invention there is provided an arrangement which can be used in particular in a media-mixing nozzle assembly intended for use with or to be incorporated in a contact reactor. The nozzle assembly enables a first medium to be mixed with a second medium. This medium mixture is used to clean a contaminated medium fed to the contact reactor, by bringing the contaminated medium into contact with the medium mixture, this mixture containing an absorbent which is capable of reacting with the contaminants in the contaminated medium. The first medium and the second medium are supplied under overpressure to a mixing chamber provided in the nozzle assembly and located upstream of the exit orifice of a nozzle. Located adjacent the exit orifice is a device for creating a boundary layer in that part of the medium which is present around the jet of medium and located adjacent the jet of medium and adjacent the exit orifice, in a manner to completely or partially prevent-recycling of the jet of medium to the wall surface of the nozzle assembly.

24 Claims, 2 Drawing Sheets

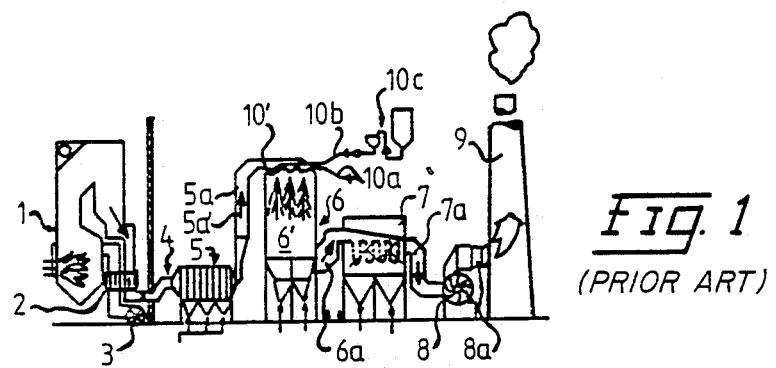
Fig. 1 (PRIOR ART)
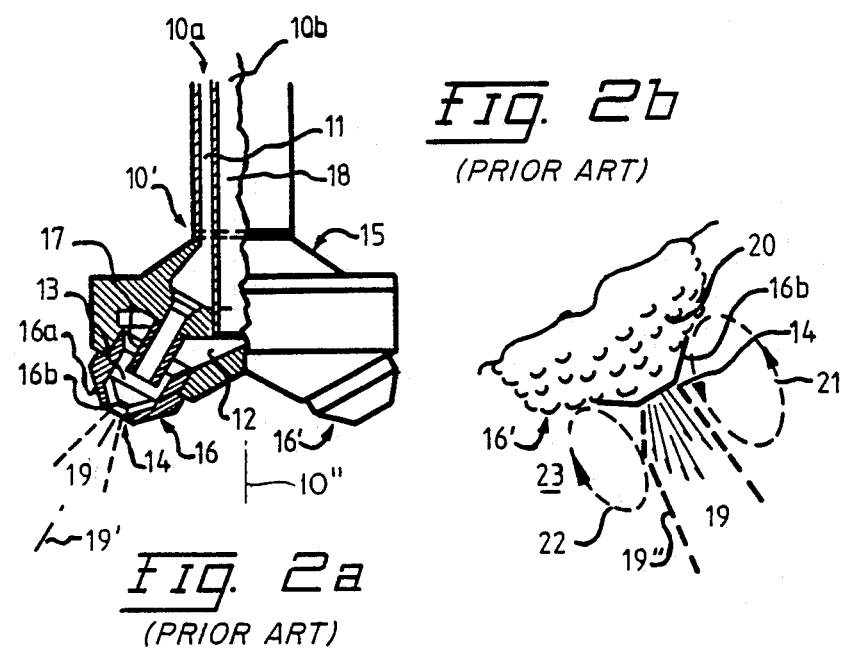
Fig. 2b (PRIOR ART)
Fig. 2a (PRIOR ART)

METHOD AND APPARATUS FOR TREATING CONTAMINATED GASES

RELATED APPLICATIONS

This application is a continuation-in-part application of application Ser. No. 07/129,874, filed on Dec. 4, 1987, which is a continuation of, application Ser. No. 06/852,635, filed on Apr. 16, 1986, both of which are now abandoned.

Technical Field

The present invention relates to an arrangement in a contact reactor. The used media-mixing nozzle assembly, incorporating one or more nozzles, belongs to the category of nozzle assemblies which are referred to as internal mixing nozzle assemblies.

BACKGROUND OF THE RELATED ART

Various forms of nozzle assemblies, and particularly media-mixing nozzle assemblies adapted to the conditions which prevail in a contact reactor and provided with one or more nozzles, are known in the art.

As an example of the known prior art, reference can be made to such nozzle assemblies as those constructed to produce a finely atomized liquid mist through nozzles incorporated in the nozzle assembly, such nozzle assemblies being designated two-media-assemblies, since such assemblies are used to mix together two media, liquid with gas. In order to atomize the liquid, the gaseous medium, which is accelerated under expansion, is permitted to act upon a liquid surface oriented upstream or downstream of the actual nozzle itself. This liquid surface is given a velocity which deviates substantially from the velocity of the gaseous medium, and is normally much lower than the velocity of the gaseous medium. Nozzle assemblies of this kind can be divided principally into two different categories, depending upon the manner in which they operate. The two categories are distinguished from one another by whether the two media to be mixed meet within the nozzle assembly itself or substantially externally thereof. Consequently, the first category is designated "internal mixing nozzle assemblies" while the second category is designated "external mixing nozzle assemblies."

The present invention relates to an arrangement which can be used to particular advantage in an internal mixing nozzle assembly. An example of such an internal mixing nozzle assembly is described and illustrated in European Patent Application No. 82110320.7, published under No. A0 0 079 081.

The method and apparatus illustrated and described in the Swedish Patent Specification No. 428,096, deriving from the U.S. Patent Application No. 488,472, filed 15 Jul. 1974, now U.S. Pat. No. 4,036,434, also form part of the prior art.

In the technique taught by this specification, a secondary fluid forms around a primary fluid exit aperture a buffer which prevents the fluid from flowing back into contact with a body incorporating the aperture, in a manner to deposit solid substances on the body.

The primary fluid passage is said to be positioned coaxially in relation to a passage for secondary fluid surrounding the primary fluid passage, causing the flow of secondary medium to from a divergent flow immediately downstream of the passage.

The apparatus of this prior art publication is particularly constructed for handling radioactive waste products containing a solution of radioactive substances in slurry form, or solid radioactive substances suspended in a slurry.

The slurry of radioactive waste is introduced into a roasting furnace at a relatively high velocity, with the aid of an injection nozzle located at a distance from the location of a fluid bed.

The known prior art in the present context also includes the apparatus described and illustrated in U.S. Patent Specification No. 2,613,737.

This specification describes an oil-burner nozzle provided with a feed pipe for supplying oil to a chamber in which the oil is mixed with air. The resultant air/oil mixture is fed to a chamber having a plurality of apertures distributed around a hemispherical body.

Secondary air is supplied through a circular slot oriented around the hemispherical body, and consequently when the secondary air exits through the slot the air takes a cylindrical configuration, which is caused immediately to diverge as a result of the air/oil mixture exiting through the apertures in the hemispherical body.

SUMMARY OF THE PRESENT INVENTION

TECHNICAL PROBLEM

When a jet of gas and/or liquid is passing through a gas it is producing secondary movements in the gas. The gas adjacent the jet will move along the jet and partly be entrained in the jet.

At the orifice of the nozzle where the jet enters the surrounding gas this will cause a lowering of the pressure because some gas is transported away. This underpressure will generate vortices adjacent the nozzle.

If the jet contains particles and/or drops of liquid some of these will leave the jet together with a part of the entrained gas and return to the surroundings of the nozzle with the generated vortices, so called back-mix vortices, therewith creating the risk of deposition of dry or semi-dry material on the body incorporating the nozzle orifice.

This deposition is very often highly undesired. The deposits will impair the function of the nozzle because they change the aerodynamic situation at the orifice. If this is critical, the nozzles must be cleaned very often. This is, e.g., the case in a contact reactor, in which a gaseous medium laden with gaseous contaminants is contacted with a fine mist of liquid containing a suspended solid absorbent which then is separated form the cleansed gaseous medium as a dry powder. Naturally the task of cleaning the nozzle assemblies at given intervals is both troublesome and tedious.

If the size of the droplets in the mist is too large, the residence time in the reactor will not be sufficient to allow a complete vaporization of the liquid and hence wet material will reach the walls of the reactor and form deposits thereon. This will in a short time lead to an enforced close down of the equipment for extensive cleaning.

It is therefore a technical problem, in a contact reactor, to provide simple means, which reduce undesirable vortices adjacent the nozzle orifices, or at least causes the vortices to form somewhat downstream the nozzle orifices. Moved away from the nozzle orifice they act as a part of the desired mixing process in the reactor.

A further technical problem resides in the provision of a multi-nozzle media-mixing nozzle assembly having simple means which prevents the formation of deposits in the near surroundings of the nozzle orifices.

Another technical problem resides in the provision of a simple media-mixing nozzle with the ability to regulate the supply of absorbent to a contact reactor while maintaining a desired size of droplets in the mist and still in a satisfactory way prevent deposition of adsorbent adjacent the nozzle orifices.

A qualified technical problem resides in provision of simple means that can be added to already existing nozzle assemblies thereby solving problems with depositions, without an extensive reconstruction of the nozzle assemblies.

Solution and Advantages

The advantages primarily associated with an arrangement according to the present invention reside in the creation of conditions which ensure the effective mixture of two media supplied to the media-mixing nozzle assembly at an overpressure, and with which the resultant mixture is able to leave the exit orifice of a respective nozzle and still prevent or reduce, with the aid of simple means, the recycling of the medium mixture to the wall surface of the nozzle assembly under the influence of secondary vortices adjacent the exit orifice.

In this way, the deposition of partly dried absorbent on the nozzle assembly or its attachments is totally, or almost totally, avoided in the contact reactor.

BRIEF DESCRIPTION OF THE DRAWINGS

An exemplifying embodiment exhibiting features characteristic of the invention will now be described in detail with reference to the accompanying drawing, in which FIG. 1 illustrates schematically and partially in section a dry-gas cleaning plant of principally known construction;

FIG. 2a illustrates in side view and partially in section a known media mixing nozzle assembly of the internal mixing type, and FIG. 2b illustrates in a slight enlarged view one of the nozzles of nozzle assembly, and further illustrates deposits of partially dried absorbent in the vicinity of the nozzle caused by secondary vortices;

DESCRIPTION OF PREFERRED EMBODIMENTS

Figure 4A:
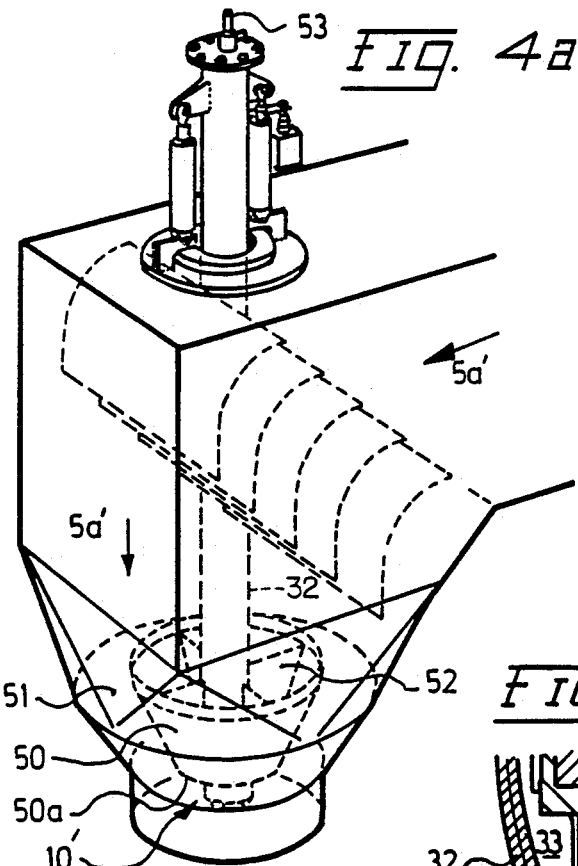
FIG. 4a is a perspective view of an upper part of a contact reactor, incorporating a multi-nozzle assembly and means according to the invention.
Figure 3:
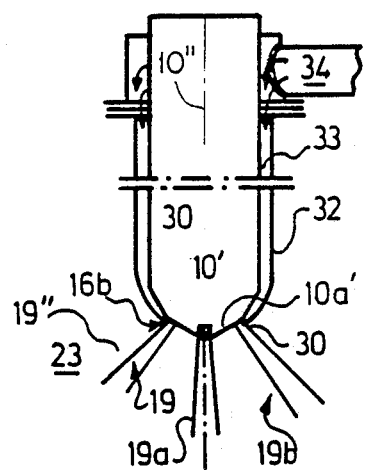
FIG. 3 is a section view of means according to the invention arranged around a nozzle assembly of the kind illustrated in FIG. 2.

FIG. 1 illustrates schematically, in side view and partly in section, for the sake of illustration, a boiler with a flue gas cleaning plant.

The plant comprises a boiler 1, an air pre-heat exchanger 2, a combustion air fan 3, an electrostatic precipitator 5, a contact reactor 6, a bag filter 7, an induced draft fan 8 and a stack 9.

The flue gases are conducted through a conduit or channel 4 to the electrostatic precipitator 5, which is connected to the contact reactor 6 by a conduit or channel 5a. A contaminated medium 5a' is fed to the contact reactor 6 through the channel 5a. The contaminants contained in the medium 5a' may be dust particles, hydrogen chloride, sulphur dioxide, etc.

Arranged in the upper part of the contact reactor 6 are a number of media-mixing nozzle assemblies 10' which are effective in mixing a first medium, in the form of air entering through a pipe 10a, with a second medium, in the form of an aqueous suspension of lime particles entering through a pipe 10b connected to a water/lime mixing device 10c.

The media-mixture prepared in the mixing nozzle assembly 10' is fed therefrom to the contact reactor and introduced to the contaminated medium 5a', whereupon the lime reacts adsorptively with the contaminants or impurities present in the contaminated medium.

The cleansed medium passes from the contact reactor 6 to the bag filter 7, via a channel 6a. Medium cleansed in the bag filter 7 is passed through a channel 7a to a fan 8, which forces the cleansed medium through a channel 8a and out through a smoke stack or chimney 9.

The present invention relates to an arrangement which is particularly useful in conjunction with a media-mixing nozzle assembly 10' of the kind particularly intended for use in a contact reactor 6 intended for cleaning a contaminated medium passing through the channel 5a. This supply is effected partly through a pipe 10b which conducts the aforementioned water/absorbent suspension, and partly through a pipe 10a through which gas or a gaseous mixture, preferably air, is conveyed, so that the two media can be mixed effectively in a mixing chamber and sprayed over the interior 6' of the contact reactor 6, via a nozzle or outlet.

FIGS. 2a and 2b illustrates a known media-mixing nozzle assembly 10' constructed in accordance with the principle of an internal mixing nozzle assembly. The nozzle assembly 10' comprises a symmetrically formed central body 15, which is provided with a chamber or cavity 12 into which there discharges a central riser pipe 18 and chamber or cavity 13 (atomizing zone) into which there discharges an airfeed conduit 11, connected respectively to the pipes 10a and 10b. The illustrated nozzle assembly 10' is provided with three symmetrically arranged nozzles, so-called mist nozzles, of which two 16, 16' are shown in FIG. 2a. Each nozzle 16, 16' comprises a circular-tubular housing 16a and presents an outlet orifice 14 which has a diameter of between 1 and 10 mm at its outer end. Located within the nozzle is a rotational-symmetric atomizing zone 13. A tubular gas nozzle 17, which communicates with the airfeed conduit 11 connected to the pipe 10a, is arranged upstream of the outlet orifice 14.

When liquid (water/lime suspension) is fed to the nozzle assembly from the pipe 10b, via the pipe 18, the atomizing zone 13 and the chamber 12 become filled with liquid. The liquid is conveyed at a pressure of between 2 and 12 bars. When a gaseous medium under sufficiently high pressure, i.e., a pressure higher than the pressure of the liquid, is supplied to the gas nozzle 17, a gas jet is generated through the atomizing zone 13. Thus, there is present in the narrowest section of the mist nozzle, i.e., in the region of its exit orifice 14, a two phase stream where the gaseous medium atomizes the liquid and forms a finely divided mist-jet or medium-jet 19.

The jet 19 leaves the exit orifice 14 while subtending an angle of about 30 between the center line 10" of a complete nozzle assembly and the center line 19' of the jet 19.

Thus, narrow mist-jets exit from their respective exit orifices, these jets being uniformly distributed around a circular line.

The following description will be made solely with respect to the jet 19 issuing from the exit orifice 14, since the conditions for all remaining jets and exit orifices are the same as those for the jet 19 and exit orifice 14.

One problem associated with the nozzle assembly according to FIGS. 2a and 2b is that the finely divided liquid issued through the orifice 14 at a high velocity and at a pressure above atmospheric, causes the occurrence of secondary turbulence or back-mix vortices, 21, 22 in the region 16b around the orifice 14, which in practice results in conglomeration of particles dissolved or suspended in the liquid conglomerating on the nozzle assembly in a slightly dried state immediately adjacent the exit orifice 14. This particle agglomeration radially changes the aerodynamic conditions around the nozzle and thus impairs the efficiency of the nozzle assembly.

Naturally, the task of cleaning the nozzles and the nozzle assembly of such agglomerations at given intervals is both troublesome and tedious.

FIG. 3 is a sectional view of an arrangement according to the present invention which is intended to be incorporated in the contact reactor and to surround a complete medium-mixing nozzle assembly comprising a plurality of nozzles each provided with a respective exit orifice, said orifices being oriented in the manner illustrated in FIG. 2. The nozzle assembly is adapted to cause a bundle of jets 19, 19*a*, 19*b* to issue from the exit orifices of respective nozzles.

As shown in FIG. 4*b*, the substantially cylindrical wall of the nozzle assembly terminates at the bottom 10*a′* thereof in a substantially rotational-symmetric form with a centrally located pointed part 10*b′* The nozzles are located in the wall 10*a′* in the bottom of the nozzle assembly.

The first 11′ and second 13′ medium are supplied under overpressure to a mixing chamber 13 common to all nozzles in the nozzle assembly. The first medium 11′, which is air, is permitted to pass through a channel 11, while the second medium 13′, which comprises moistened lime particles or an aqueous suspension of lime particles, is supplied to the nozzle assembly through a channel 18. Both of these media are passed to the common mixing chamber or cavity 13.

A casing 32 is located adjacent the exit orifice 14′, and said casing 32 is adapted to pass a gaseous medium along the curved wall surface 10*a′* of the nozzle assembly.

FIG. 3 shows that the nozzle assembly 10′ has a tapering external configuration, preferably a slightly conical configuration, in the proximity of the nozzle orifices and the jets of medium 19, 19*a*, 19*b*, and that a stream of air or a stream of gas is directed to converge towards the center line 10″ of the nozzle assembly through the agency of an annular slot 30, thereby intersecting the jet of medium 19. When leaving the slot 30, the air or gas stream forms an angle of from 80°-100°, or about 90° with the geometric center line 19′ of the jet 19. Incidence angles of from 60-120 also lie within the scope of the invention.

Each stream of medium issuing from respective nozzles exhibits a component which is parallel with the geometric center line 10″ through a nozzle assembly which center line normally is parallel with the direction in which the gaseous contaminated medium is fed through the contact reactor.

The angle included by the center direction component 19′ of the direction of the jet 19 and the center line 10″ through the nozzle assembly should not exceed 80°, and is preferably smaller than 60°.

The air stream issuing from the annular slot 30 forms a circularly distributed air-jet or air-curtain 31*a* directed towards the center 10″ of the nozzle assembly.

The air-curtain or gas-curtain 31*a* thus has a uniform or substantially uniform effect around the jet of medium 19 in the proximity of parts of the vortices 21 and 22 facing the nozzle exit-orifice 14′. The arrangement is preferably formed so as to displace the secondary vortices 21, 22 generated by the jet 19 in a manner to create conditions which will prevent the formation of deposits 20 on the outer wall-surface of the nozzle assembly.

In the embodiment illustrated in FIG. 3, a casing 32 surrounds the outer confines of the nozzle assembly 10′, so as to define therebetween a narrow channel 33 which merges with an annular slot 30, the diameter of which is somewhat larger than the diameter of the circle on which the nozzles 16, 16′ are located.

In this way there is formed adjacent the nozzle orifice 14′ a boundary layer which converges towards the center line 10″ of the nozzle assembly 10′.

The slot 30 has a width of --from 2–10 mm, more preferably 3–6 mm or about 4mm. and the distance from the inner surface of the casing 32 defining the slot 30 to the exit orifice 14′ of the adjacent nozzle 16 is --from 5–50 mm, more preferably 10–30 mm, or --; about 15 mm.

The gas leaves the slot 30 at a velocity of -- from 10–150 m/sec, more preferably 50–100 m/sec, or --; about 75 m/sec; the contaminated flow of medium 23 has a velocity of about 20–25 m/sec; and the mixed flow of media 19 has a velocity at the orifice 14′ of about 250–300 m/sec.

A channel 33 is connected to a source of pressure, via a conduit 34, in a manner which enables the pressure to be regulated or held at a contact level.

The flow of gas through channel 33 and slot 30 may also consist of the contaminated medium 23.

In conjunction with the embodiment illustrated in FIG. 4*b*, it is proposed by way of example that the air pressure in the channel 11 shall be capable of reaching 12 bars, while the pressure of the liquid in the channel 18 shall be capable of reaching 8 bars, although the air pressure should always be higher than the pressure of the liquid in the channel 18.

As illustrated in FIG. 4*b*, it shall be possible to generate the boundary layer 31*a* by either adjusting the speed of the gas through the slot 30 or by maintaining the gas flow at a constant velocity. The boundary layer 31*a* is generated by creating adjacent the exit orifice 14′ of the nozzle, with the aid of means therefor, a pressure which is higher than the pressure prevailing downstream of the orifice and adjacent the jet of medium 19.

The casing 32 and the slot 30 are arranged to generate a boundary layer close to the nozzle orifice through which the jet 19 exits, or alternatively in the close vicinity of a number of orifices through which respective jets exit.

Although in the FIG. 4*b* embodiment the aforesaid means has the form of an annular slot 30 which encircles all nozzle exit orifices of the nozzle assembly 10′ and the jets issuing from said orifices, it will be understood that the casing 32 may have the form of an annular slot arranged to encircle solely one nozzle exit orifice and the jet issuing therefrom.

Another possibility is that the surface defining the slot is composed of a plurality of preferably uniformly spaced circular arcs, with each arc located concentrically with a respective nozzle.

The gas flow through the slot 30 is chosen to comprise an air stream effective to form a circular air curtain 31a having velocity vectors directed towards the geometric center line 10" of the nozzle assembly 10'.

Figure 4B:
FIG. 4b shows in more detail part of the means located in the immediate proximity of the left-hand nozzle of the assembly.
Figure 5:
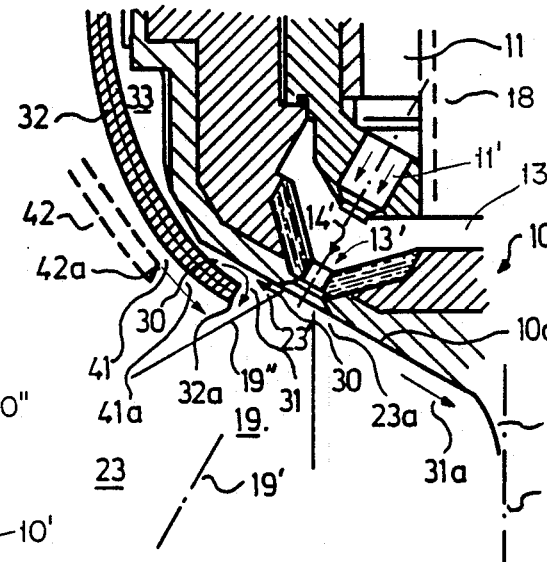
FIG. 5 is a sectional view of a multi-nozzle assembly exhibiting a plurality of nozzle exit orifices and illustrates a modification to the exit orifice of one nozzle.

In the FIG. 4b embodiment, the exit orifice 14' is located in the bottom wall 10a' of the nozzle assembly, although it will be understood that it also lies within the concept of the invention to locate the exit orifice, or exit orifices, slightly outside the bottom wall 10a' of the nozzle assembly. In this latter case, the orifice 14' is preferably extended with the aid of a thin-walled tubular element, not shown.

As shown in FIG. 4b, the bottom wall 10a' of the nozzle assembly 10' located adjacent the nozzle orifice 14' has a substantially rotational-symmetric form and presents a centrally located pointed part 10b' adapted to cause the air stream 31a adjacent the nozzle assembly 10' to be deflected towards the directions of the geometric center line 10".

As shown in FIG. 4b, the air curtain is intended to flow substantially uniformly towards the center 10" of the cylindrical wall and therewith form a substantially uniform boundary layer 31a which is effective over the whole of the bottom wall 10a', so as to prevent the agglomeration of absorbent thereon.

The casing 32 provided with the opening is arranged to encircle the nozzle assembly 10' in a manner to form a slot 30 between the inner surface of the casing 32 and the outer surface of the bottom wall 10a' of the nozzle assembly 10', and to supply gas under overpressure through a channel 33 formed between the casing 32 and the wall of the nozzle assembly.

A further casing 42 provided with an opening 42a can be placed around the casing 32 and spaced therefrom to form a slot 41 between the inner surface of the outer casing 42 and the outer surface of the casing 32, such that gas is passed between the outer casing 42 and the casing 32.

The slot between the outer casing 42 and the casing 32 is formed at a distance from the slot 30 between the casing 32 and the bottom wall 10a' of the nozzle assembly in a direction away from the jet of medium 19, so as to form thereby a boundary layer 41a around the casing 32 in the manner described with reference to the boundary layer 31a.

The width of both the slot 30 and the slot 41 can be made adjustable, by arranging the casing 32, and optionally also the casing 42, in a manner which enables the casing or casings to be raised or lowered relative to the nozzle assembly 10'. Adjustment of the width of the slots results in an adjustment to boundary layers 31a and 41a.

Respectively slots 30, 41 may be placed in communication with a source of overpressure, with which the pressure can be regulated or held constant.

The embodiment of the nozzle assembly 10' and the casing 32 illustrated in FIG. 4b can be mounted in a conical funnel 50, which in turn is embraced by a channel 51 as shown in FIG. 4a.

The funnel 50 narrows in the downstream direction, and the nozzle assemblies are located immediately downstream of the lowermost edge part 50a of the funnel 50. The funnel is provided with turbulence generating means in the form of guide vanes 52.

Contaminated medium 5a' is passed down into a construction through the channel 51, and through the funnel 50 and past the nozzle assembly 10'.

Air is supplied to the slot of the illustrated embodiment, via a connection 53.

The actual reaction takes place downstream of the nozzle assembly 10'.

FIG. 5 illustrates an alternative embodiment of a nozzle assembly 10′, in which the nozzle orifice 14′ is extended by means of a tubular element 54, the outermost orifice 55 of the tubular element being located slightly downstream of the slot 30.

The orifice 55 should be located at a distance which exceeds twice the width of the slot 30 of the casing 32, preferably about three times said width.

In other respects the embodiment illustrated in FIG. 5 is the same as that illustrated in FIG. 4*b*.

It will be understood that the invention is not restricted to the illustrated and described exemplifying embodiments and that modifications can be made within the scope of the following claims.

What is claimed is:

1. A contact reactor, comprising:

(a) contact reactor chamber;

(b) a chamber inlet through which a medium laden with gaseous contaminants is introduced into the chamber;

(c) an outlet through which cleansed medium leaves the chamber;

(d) a media-mixing nozzle assembly including an outer wall surface and internal means for mixing a first medium in the form of a gas with a second medium in the form of a liquid/absorbent suspension and introducing the resultant medium mixture into the chamber through a nozzle orifice in the form of a jet of medium;

said nozzle assembly including a plurality of nozzle orifices arranged in the outer wall surface in a substantially circular pattern;

means for creating around the nozzle assembly a converging boundary media-layer for contacting each of the jets of medium leaving the respective nozzle orifice and preventing said jets of medium from flowing back to the wall surface of the nozzle assembly, said creating means comprising means defining a slot located adjacent to but externally of the substantially circular pattern of nozzle orifices for directing the boundary media-layer as a curtain towards a center line of the nozzle assembly; and said nozzle assembly including pointed means located centrally with respect to said circular pattern of nozzle orifices and said creating means projecting from the wall surface into the boundary media-layer for contacting the boundary medialayer and deflecting the direction of the boundary media-layer towards the center line of nozzle assembly.

2. A contact reactor according to claim 1, wherein the creating means includes means for flowing the boundary medialayer through the slot; and said nozzle orifices are spaced at mutually the same distance apart. in the circular pattern in the outer wall surface--.

3. A contact reactor according to claim 1, wherein the slot is circular and has a diameter which is larger than a diameter of the circular pattern of the nozzle orifices.

4. A contact reactor according to claim 1, wherein the creating means is arranged so as to direct the boundary media-layer towards the center line of the nozzle assembly and intersect each of the jets of medium within an angular range of 60-120° degrees with respect to the direction of each of the jets of medium--.

5. A contact reactor according to claim 1, wherein the creating means is arranged such that the boundary media-layer flows substantially uniformly in towards the center of the wall surface and therewith generates a boundary layer which acts substantially uniformly over the whole of the wall surface, therewith to prevent the agglomeration of absorbent on said wall surface.

6. A contact reactor according to claim 1, wherein said means defining a slot includes a casing with an inner surface defining an opening arranged to encircle the nozzle assembly in a manner to form the slot between the inner surface of the casing and the outer wall surface of the nozzle assembly such that the boundary media layer can be supplied between the casing and the nozzle assembly.

7. A reactor according to claim 6, wherein the slot has a width of from 2-10 mm; and the distance between each of the nozzle orifices and the inner surface of the casing is from 5-50 mm.

8. A contact reactor according to claim 1, wherein the nozzle orifices include means defining an extension that projects into the boundary layer.

9. An arrangement according to claim 1, wherein the means for creating the boundary media-layer includes means for introducing a portion of the gaseous contaminants into the boundary media layer.

10. A nozzle arrangement for a contact reactor chamber having gaseous contaminants therein, comprising:

a nozzle assembly having a center line and a plurality of exit orifices;

means within the nozzle assembly for mixing a first gaseous medium with a second medium in the form of a liquid/absorbent suspension and emitting the resultant medium mixture into a contact reactor chamber through each of the exit orifices in the form of jets.

means for creating an air stream around said nozzle assembly and for converging the air stream toward the exit orifices such that said air stream intersects each of the emitted jets at an angle with respect to the direction of each of the jets so as to prevent the jets from flowing back and contacting the nozzle assembly; and means centrally located on said nozzle assembly with respect to the exit orifices and projecting from said nozzle assembly into said air stream for contacting said air stream and deflecting the direction of the air stream toward the center line of the nozzle assembly.

11. The nozzle arrangement of claim 10, wherein the means for creating the air stream is located such that the air stream intersects each oft he jets at an angle between 60° and 120° from the direction of each of the jets.

12. A method for treating gaseous contaminants in a contact reactor chamber, comprising the steps of:

mixing a first gaseous medium with a liquid/absorbent suspension in a nozzle assembly having a center line to form a medium mixture;

emitting the medium mixture in the form of jets into the contact reactor chamber through a plurality of exit orifices of the nozzle assembly;

creating an air stream around said nozzle assembly;

converging said air stream toward the exit orifices;

intersecting each of the jets with the air stream at an angle from the center line of the nozzle assembly; and deflecting said air stream toward the center line of the nozzle assembly with a pointed part of said nozzle assembly that projects into the air stream at a location centrally located with respect to the exit orifices.

13. The method of claim 12, wherein the air stream has a velocity within the range of 10-150 m/sec which is substantially smaller than the velocity of the medium mixture exiting through the exit orifice of the nozzle assembly.

14. The method of claim 13, wherein the velocity is within the range of 50–100 m/s. --

15. An apparatus, comprising:

(a) a contact reactor chamber;

(b) a media-mixing nozzle assembly located in said chamber;

(c) a chamber inlet through which a gaseous medium laden with gaseous contaminants is introduced into the chamber;

(d) an outlet through which a cleansed gaseous medium leaves the chamber;

the nozzle assembly including:

an outer wall surface, a plurality of nozzles having exit orifices arranged therein in a substantially circular pattern around a center line of the nozzle assembly, and means for mixing a first medium, in the form of a gas or a gas mixture, with a second medium, in the form of a liquid/absorbent suspension, with the resultant medium mixture being introduced into the chamber through said plurality of nozzles in the form of jets of medium, and there brought into contact with the contaminated medium;

creating means for creating a converging boundary layer around said nozzle assembly by directing a gas jet towards said center line of the nozzle assembly along the wall surface so as to intersect each of the jets of medium within an angular range of 60-120 degrees with respect to the direction of each of the jets of medium--. whereby recycling of said jets of medium back to the outer wall surface of the nozzle assembly is substantially prevented; and pointed means, located centrally with respect to the center line of the nozzle assembly and centrally with respect to said boundary layer creating means, projecting from said wall surface into the boundary layer, for deflecting the direction of the boundary layer toward the center line of the nozzle assembly.

16. An apparatus according to claim 15, wherein said creating means comprises means defining a slot located adjacent to but externally of the nozzles in the nozzle assembly for directing the gas jet towards the center line of the nozzle assembly.

17. An apparatus according to claim 16, wherein the slot is circular.

18. An apparatus according to claim 15, wherein the boundary layer creating means is arranged such that the boundary layer flows substantially uniformly, along said wall surface, in towards the center line of the nozzle assembly.

19. An apparatus according to claim 15, wherein the creating means comprises a casing with an inner surface defining an opening arranged to encircle the nozzle assembly in a manner to form a slot between the inner surface of the casing and the outer wall surface of the nozzle assembly, such that gas for the boundary layer can be supplied between the casing and the nozzle assembly.

20. An apparatus according to claim 19, wherein the slot has a width within the range of 2 to 10 mm.

21. An apparatus according to chain 20, wherein the slot has a width the range of 3 to 6 mm.

22. An apparatus according to claim 20, wherein the distance between the inner surface of the casing and each of the nozzles orifices has within the range of 5 to 50 mm.

23. An apparatus according to claim 22, wherein the distance between the inner surface of the casing and each of the nozzle orifices lies within the range of 10 to 30 mm.

24. An apparatus according to claim 15, wherein the creating means is arranged such that the angular range is between 80 to 100 degrees.

* * * * *